United States Patent
von Rothkirch und Panthen et al.

(10) Patent No.: US 9,139,117 B2
(45) Date of Patent: Sep. 22, 2015

(54) CENTER ARM REST WITH TABLE

(71) Applicant: F.S. Fehrer Automotive GmbH, Kitzingen (DE)

(72) Inventors: Eberhard von Rothkirch und Panthen, Sommerach (DE); Thomas Hessdorfer, Karlstadt (DE); Manfred Dehn, Kitzingen (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 0 days.

(21) Appl. No.: 14/196,863

(22) Filed: Mar. 4, 2014

(65) Prior Publication Data
US 2014/0319867 A1    Oct. 30, 2014

(30) Foreign Application Priority Data

Apr. 30, 2013   (DE) .......................... 10 2013 207 930

(51) Int. Cl.
*B60N 2/00* (2006.01)
*B60N 2/46* (2006.01)
*B60N 3/00* (2006.01)
*B60N 3/10* (2006.01)

(52) U.S. Cl.
CPC ............ *B60N 2/4606* (2013.01); *B60N 2/4613* (2013.01); *B60N 2/4633* (2013.01); *B60N 2/4686* (2013.01); *B60N 3/002* (2013.01); *B60N 3/004* (2013.01); *B60N 3/101* (2013.01)

(58) Field of Classification Search
CPC ....... B60R 7/04; B60N 2/4633; B60N 2/4606
USPC ................ 296/24.34, 1.09, 37.8; 297/411.32, 297/411.21, 411.3
See application file for complete search history.

(56) References Cited

U.S. PATENT DOCUMENTS

| | | | |
|---|---|---|---|
| 6,598,934 B1 * | 7/2003 | Anderson | 297/162 |
| 8,789,881 B2 * | 7/2014 | von Rothkirch und Panthen et al. | 297/113 |
| 2003/0122392 A1 * | 7/2003 | Larsen et al. | 296/24.1 |
| 2010/0244502 A1 | 9/2010 | Andersson et al. | |
| 2012/0104822 A1 * | 5/2012 | Henke et al. | 297/411.32 |

FOREIGN PATENT DOCUMENTS

| | | |
|---|---|---|
| DE | 198 08 404 A1 | 9/1999 |
| DE | 10 2006 025 083 A1 | 12/2007 |
| DE | 10 2010 003 184 A1 | 12/2010 |
| DE | 20 2011 106 677 U1 | 11/2011 |

* cited by examiner

*Primary Examiner* — Joseph D Pape
*Assistant Examiner* — Dana Ivey
(74) *Attorney, Agent, or Firm* — Billion & Armitage; Benjamin C. Armitage (57) ABSTRACT

The invention relates to a center arm rest (01) for use in a vehicle with a console part (03), which can be directly or indirectly attached to the vehicle body, and with an arm rest (05), which is mounted on the console part so as to be swivelable about a swivel axis between a lower use position and an upper rest position, the arm rest (05) having a top side (07) for resting an arm thereon, which is padded at least in sections, and a bottom side (08) on the opposite side, which is padded at least in sections and forms part of a back rest, comprising a tray device (11), which is swivelably mounted in the center arm rest (01) and which is in an upper non-use position behind the arm rest (05) when the arm rest (05) is in the rest position, and which is swivelable about a hinge axis (12) between the non-use position and a lower use position having the tray device (11) resting on the top side of the arm rest (05) when the arm rest (05) is in the use position.

20 Claims, 8 Drawing Sheets

CENTER ARM REST WITH TABLE

CROSS-REFERENCE TO RELATED APPLICATION

This application claims the benefit of German patent application number 10 2013 207 930.3 filed on 30 Apr. 2013, and which application is incorporated herein by reference. A claim of priority is made.

BACKGROUND

There may be times when it is desired that a tray surface be available at the seats so as to enable storing of devices, cups, or other items, for example. For this purpose, at least the padded surface of the arm rest is highly unsuitable. From the state of the art, however, different designs are known for solving this problem.

In a first embodiment, a removable lid is used in an arm rest. First of all, said lid comprises a padded surface on the side facing the passenger cabin for the use as an arm support. One aspect is that the lid cannot only be adjusted, but also be removed completely. By turning the lid over and by reinserting it into the arm rest, a largely plane surface for placing various items is created.

On the one hand, it is disadvantageous that the lid has to be completely removed from the arm rest and then be placed on it again in a turned position. The nature as a loose part of the arm rest, however, is particularly disadvantageous. There may be the risk that, for whatever reason, the lid is removed completely without being immediately reinserted and that it might not be available again at a later time.

For realizing storage options in back seats, it is further known to integrate a tray table in the back rest of a front seat, which tray table can be swung up appropriately from the back rest and can be retained in that position.

In another alternative, a folding table is arranged beneath a center part of the seat surface of the back seat bench, which center part is positioned in front of the center arm rest. By swinging up the center seat surface, the table surface is provided. This embodiment, however, is conditioned on sufficient space in the vehicle for the seat surface to be swiveled forward in order to be able to make the corresponding table surface accessible, which is not possible in many vehicles.

Also, embodiments are known in which a lid of a center console of the front seats is used in a position swiveled backwards by 180° so as to form a table for the back seat bench. This, however, causes the problem that passengers sitting in the front are deprived of the center console as an arm support.

SUMMARY

Embodiments relate to a center arm rest for use in a vehicle, including a console part being directly or indirectly attachable to a vehicle body, and an arm rest, which is mounted on the console part so as to be swivelable about a swivel axis between a lower use position and an upper rest position. The arm rest includes a top side for resting an arm thereon, which is padded at least in sections, and a bottom side on the opposite side, which is padded at least in sections and forms part of a back rest, and a tray device which is swivelably mounted in the center arm rest and which is in an upper non-use position behind the arm rest when the arm rest is in the rest position and which is swivelable about a hinge axis between the non-use position and a lower use position having the tray device resting on the top side of the arm rest when the arm rest is in the use position.

DETAILED DESCRIPTION

The invention relates to a center arm rest with a console part being attachable within a vehicle and with an arm rest being swivelably mounted thereto.

Center arm rests are known in various embodiments from the state of the art, wherein, in the present case, those center arm rests are considered which can form part of a back seat bench. In this context, the arm rest comprises a padded surface facing the passenger cabin so as to function as part of the back seat bench and to provide corresponding seat comfort. However, if the arm rest is used in its function as an arm support by being swiveled down, the arm rest also has a padded surface facing the passenger cabin. In this context, it is optional whether, for example, tray devices or compartments are integrated in the arm rest. It is the primary task to provide padded surfaces on both sides.

Therefore, it is the object of the present invention to provide in a simple and uncomplicated manner a table for passengers sitting in the back seat bench.

First of all, a generic center arm rest is designed to be used in a vehicle. In this context, it comprises a console part, which can be attached directly or indirectly to the vehicle body. For example, the console part can in turn form part of a swivelable back seat bench. On the console part, an arm rest is mounted so as to be swivelable about a swivel axis, the arm rest being available for use as an arm support in a lower use position and being able to form part of a back seat bench in an upper rest position. Correspondingly, when considering the use position, the arm rest comprises a top side, which is padded at least in sections to be used as an arm support, and a bottom side on the opposite side, which is padded at least in sections as part of a back rest.

According to the invention, a tray device is now added to the center arm rest, which in turn is swivelably mounted at the center am rest. In the upper rest position of the arm rest, the tray device is in an upper non-use position behind the arm rest and thus usually between the arm rest and the seat structure of the back rest when the center arm rest is in the installed state in the vehicle. In the use position of the arm rest, however, the tray device can be swiveled about a hinge axis between the non-use position and a lower use position. This means that in the use position of the arm rest, the tray device can remain swung up in the area of the back rest and can also be swung down into a lower use position for use. In this context, it is further provided that in the use position, the tray device is supported on the top side of the arm rest and thus is resting thereon.

By the addition of the tray device according to the invention, it is made possible in a comfortable and simple manner for the passengers sitting in the back to use a table function. No loose parts are needed for this purpose, and neither is a larger structural space for the arrangement of the tray device required.

In this context, it is particularly advantageous if in the use position, the tray device has a substantially plane table surface. Although different embodiments would be possible, such as a shell shape, a largely plane table surface offers the possibility of placing many different items thereon, such as, in particular, small electronic devices, which can still be comfortably used while resting on the table surface. For this purpose, it is further advantageous if the table surface is provided with a slip-resistant surface structure and/or surface coating so that the item placed thereon does not suddenly move during driving maneuvers.

For realizing the tray device, a carrier element is advantageously used, which is correspondingly mounted at the center arm rest so as to be swivelable about the hinge axis. The table surface is provided by a table element, said table element being adjustably mounted on the carrier element. The adjustability of the table element relative to the carrier element is advantageously realized such that the table element is slidable in the plane of the table surface and/or swivelable vertically to the table surface about a rotation axis.

By realizing the tray device with a carrier element and a table element, the possibility is created to change the position of the table as a function of the respective manner of use. In particular, the fact is thus taken into account that, when being used, the table surface is preferably positioned forward if possible, whereas the table element is to be oriented toward the carrier element as compactly as possible for storing the tray device in the non-use position.

In this context, it is particularly advantageous if the width of the table element is smaller than the width of the arm rest. Thus, it is made sure that the space necessary for the tray device in its width does not exceed the space that is required anyway for the center arm rest without the tray device and that the back rest components present on both sides of the center arm rest are thus not influenced by the tray device. For realizing a large table surface, however, it is advantageous if the length of the table element (measured vertically to the width) is larger than the width of the arm rest, wherein in the use position of the tray device, the table element extends beyond the arm rest on both sides by the table element being swiveled in particular by 90°. By employing a corresponding swivel motion of the table element, in the use of the table element it is made possible to realize a width which exceeds the width of the arm rest without there being a risk of collision with the back rest surrounding the center console in the non-use position.

An advantageous forward displacement of the table element for use of the table surface and, at the same time, the use of the length of the table element transversally to the longitudinal extension of the arm rest is achieved if, for the swivelable mounting, the rotation axis for swiveling the table element is arranged eccentrically in such a manner that, additionally, a forward displacement takes place because of the swiveling of the table element.

A cost-effective and simple connection of the carrier element and the table element in the swivelable design is achieved if the elements are connected by an annular latching mechanism. For this purpose, the elements can have complementary bearing rings with an end-side thickening, wherein a bearing ring can be slotted for latching.

For ensuring the necessary stability in particular of the connection between the table element and the carrier element, it is advantageous if, apart from the mounting of the table element in the rotation axis on the carrier element, the carrier element or the table element further has an annular groove, which is arranged concentrically to the rotation axis and in which a holding means of the table element or of the carrier element engages, respectively. Thus, in particular in case of an eccentric arrangement of the rotation axis, an additional connection between the table element and the carrier element can be formed without a high amount of effort by using the additional annular groove and the holding means arranged on the respective other component.

In this context, it is particularly advantageous if the groove further comprises latching means for defining the end positions. In case of a suitable shape of the groove, for example with elastic portions to be overcome by the holding means, corresponding end positions can be realized. Thus, the table element can be locked in a first end position to maintain the non-use position and in a second end position for using the table surface after the adjustment.

Oftentimes, center arm rests comprise further storage components. In this case, it is particularly advantageous if the carrier element has an opening in the area of the storage component although it is not necessary that the entire storage component is made accessible by the opening. At least, a suitable opening makes it possible to still make use of the corresponding storage component of the arm rest, albeit in a limited manner. For this purpose, however, it is necessary for the table element to unblock access to the storage component by being shifted and/or swiveled. This means that it is unproblematic in the non-use position if the table element covers the opening and the storage component of the arm rest is consequently blocked by the table element once the tray device has been swung down onto the arm rest. However, the possibility is created to access the storage component through the opening in the carrier element at the latest when adjusting the table element. The storage component can in particular be a cup holder, wherein, for example, if two cup holders are arranged, the opening unblocks access to one of the two cup holders while the other cup holder remains blocked when using the tray device.

Different options are available for mounting the tray device at the center arm rest. In a first embodiment, the hinge axis is arranged above the swivel axis, the connection taking place at the console part. As a result, the tray device initially remains in its position when the arm rest is swiveled from the rest position into the use position, and the tray device is brought into its use position only by an independent swivel motion onto the arm rest. The return of the tray device into the non-use position, however, can take place simultaneously with the re-swiveling of the arm rest from the use position into the rest position if the table element is positioned appropriately. For realizing a low structural height of the tray device, it is particularly advantageous if the hinge axis is located at least slightly below the top side of the arm rest in the use position so that it is provided that the tray device rests on the arm rest in the use position.

Alternatively, it is also conceivable to mount the tray device at the arm rest, wherein the hinge axis is likewise advantageously located above the swivel axis. In that case, a swiveling of the arm rest from the rest position into the use position leads directly to a co-swiveling of the tray device. This means that, usually, the table function of the tray device is available first, whereas the tray device has to be swung upward again for the use as an arm support.

It is particularly advantageous, however, if the swivel axis is also the hinge axis. In this way, it is avoided that significant additional space is required for the mounting of the tray device. It is further advantageous that due to the presence of bearing means for mounting the arm rest on the console part, said bearing means can also be used in an advantageous manner to allow for the mounting of the tray device.

In an advantageous manner, the tray device comprises bearing straps on both sides for mounting the tray device, which bearing straps are assigned to the carrier element in the case of a design comprising a carrier element and a table element. In this context, they are to be arranged laterally of the arm rest so that in an advantageous manner no engagement into the surface of the arm rest is necessary. In this context, the arrangement between the arm rest and the console part viewed in the direction of the swivel axis is particularly advantageous. Alternatively, however, the arrangement outside of the console part would be conceivable as well. The expressions "laterally of the arm rest" and "outside of the console part", however, are not to be understood to mean that the tray device should be wider than the arm rest. Instead, the opposite is true, namely that the tray device should be narrower than the arm rest. The expressions "laterally of the arm rest" and "outside of the console part" refer only to the mounting area of the arm rest and of the tray device with regard to this advantageous embodiment.

For a swivelable attachment of the tray device at the center arm rest, in a first particularly advantageous embodiment, the bearing straps have a hook shape open toward the hinge axis. Due to this shape, it is possible to mount the tray device from the open side of the hook shape onto corresponding bearing means. This permits in particular the mounting of the tray device after the arm rest has already been mounted at the console. Mounting can take place in the form of clipping, for example onto a bearing bolt, in case of a corresponding design of the hook shape.

In a second advantageous embodiment, the console part or the arm rest (depending on the mounting location) comprises first bearing means on both sides for mounting, each bearing strap having a second bearing means that is complementary to the first bearing means. In this case, it is to be advantageously noted that the bearing straps are elastically deformable in the direction of the hinge axis for mounting the tray device. Because of the deformability of corresponding bearing straps, the tray device can also be mounted after the mounting of the arm rest in a particularly simple manner, wherein the one bearing means can be bearing bores and the other bearing means can be bearing bolts.

It is self-explanatory that in a particularly advantageous embodiment, an at least bilateral mounting of the tray device takes place, which is in particular mirror-symmetric.

In the following figures, an exemplary embodiment for a center arm rest with a tray device is illustrated.

Figure 1A:
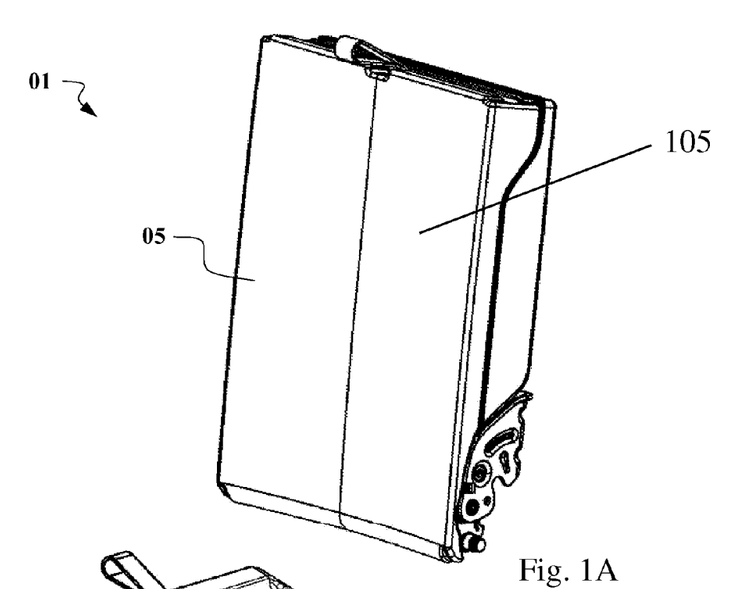
FIGS. 1A-B show views of the center arm rest in the rest position.
Figure 1B:
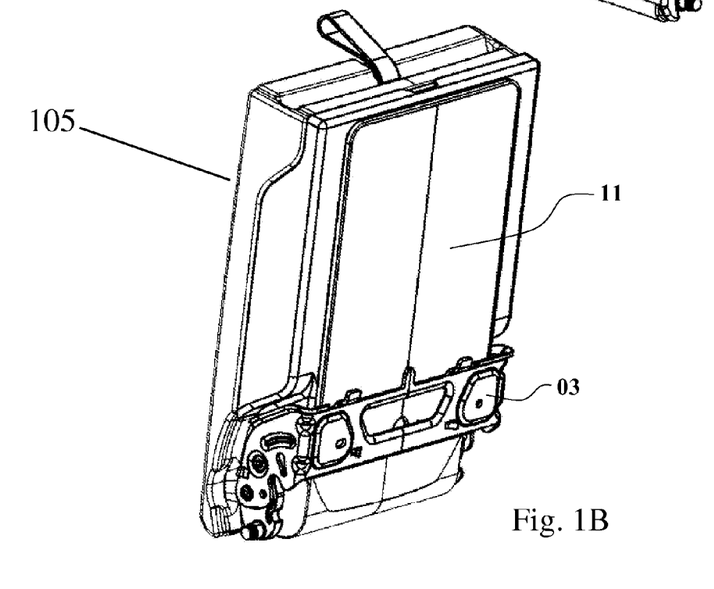

In FIG. 1, an example for a center arm rest 01 according to the invention is shown in a perspective view from the front (FIG. 1*a*) and in a perspective view from the rear (FIG. 1*b*). In this case, the arm rest 05 is in the upper rest position, wherein it is used as part of the back rest 105. As it is common for center arm rests, the arm rest 05 is swivelably mounted on a console part 03, which can in turn be directly or indirectly attached to the vehicle body.

According to the invention, this center arm rest 01 comprises a tray device 11, which can provide a storage surface for the passenger. In the situation illustrated here, the tray device 11 is in an upper swung-back non-use position behind the arm rest 05 in the rest position. It is obvious how the tray device 11, when installed in the vehicle, becomes part of the surrounding back rest and how it vanishes behind the arm rest 05 in the rest position so as to become invisible.

Figure 2A:
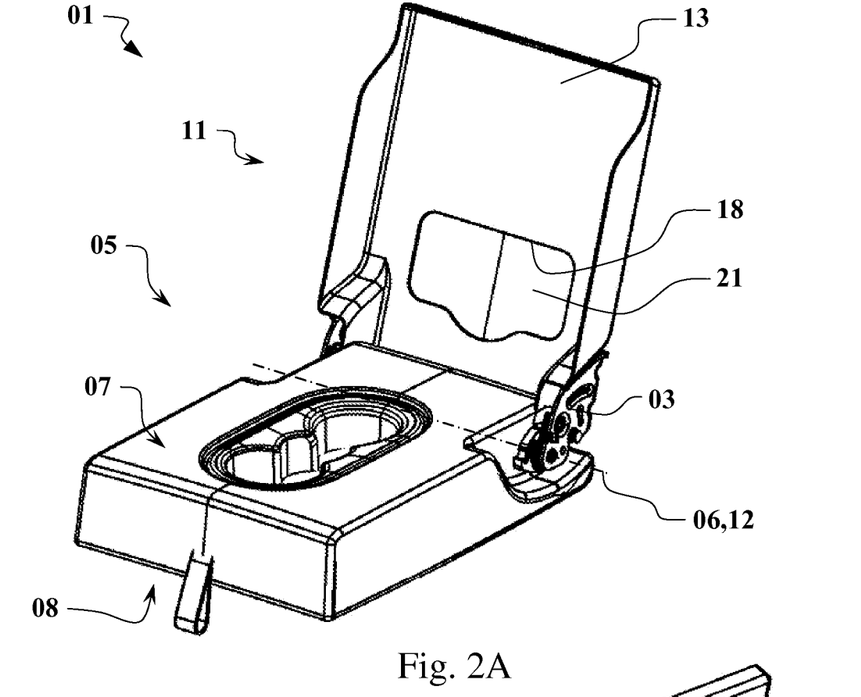
FIGS. 2A-B show the center arm rest with a swung-down arm rest and with the tray device in the non-use position.
Figure 2B:
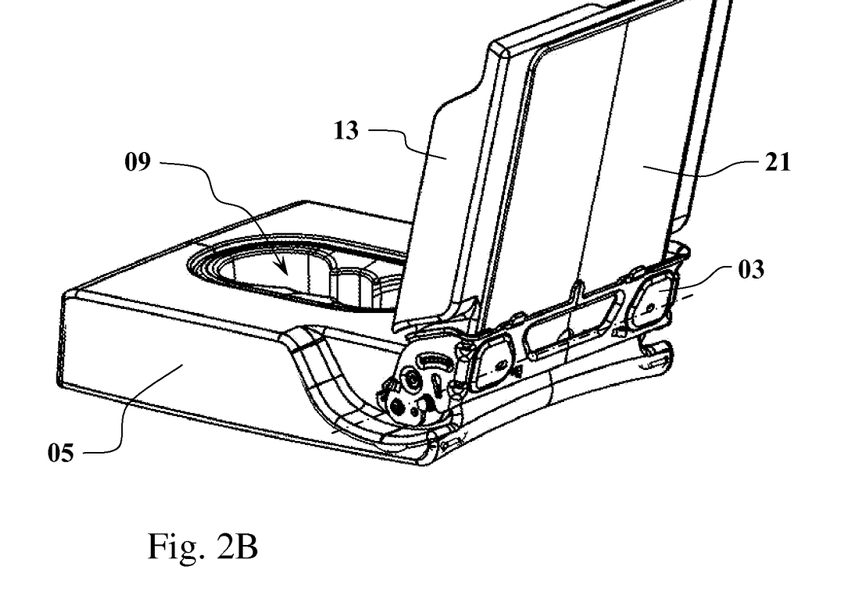

In FIGS. 2*a* and 2*b*, the center arm rest 01 is now shown with an arm rest 05 swiveled down into the use position. It is visible that the arm rest 05 has a storage component in the manner of a cup holder 09 on the top side 07 now facing the passenger cabin. The surrounding area of the top side 07 is padded for the use of the arm rest 05 as an arm support. The same is obviously true for the bottom side 08, which provides padding for the use as a back rest.

The tray device 11 of the center arm rest 01 present according to the invention is swivelably mounted at a hinge axis 12, the latter coinciding with the swivel axis 06 for swiveling the arm rest in this embodiment. If there is no relevant friction and/or latching connection to the arm rest 05, this design leads to the tray device 11 initially remaining in the non-use position shown in FIGS. 2*a* and 2*b* when the arm rest 05 is swiveled. The tray device 11 per se is composed of the carrier element 13 and of the table element 21 mounted thereto. In FIG. 2*a*, it is further visible that the carrier element 13 has an opening 18 which is covered by the table element 21 in the non-use position.

Figure 3:
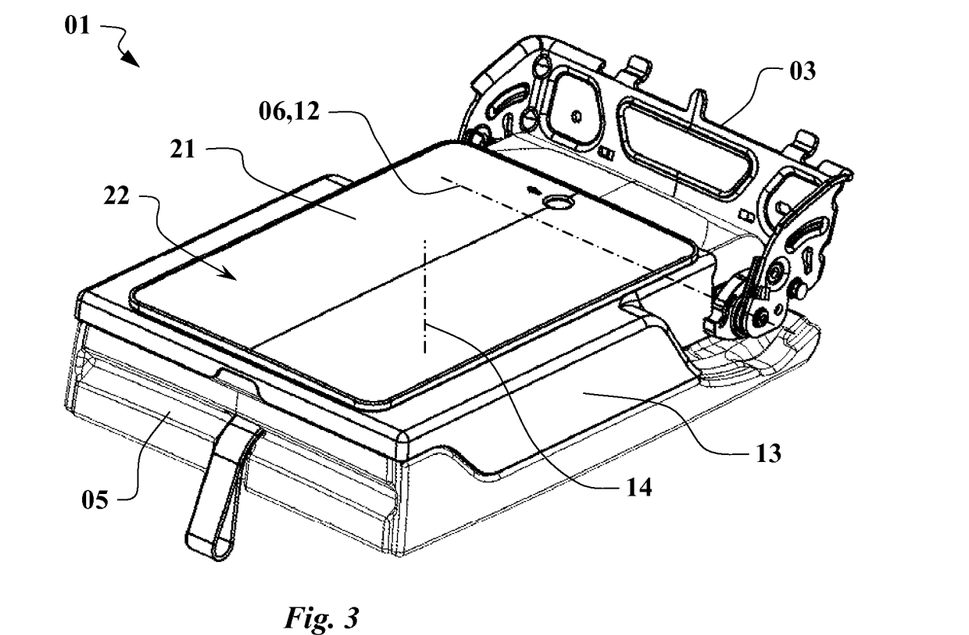
FIG. 3 shows the center arm rest with the tray device in the use position.

In FIG. 3, the center arm rest 01 is now shown with the arm rest 05 in the use position and with the tray device 11 in the use position. Herein, the tray device 11 is swiveled down onto the arm rest 05 in such a manner that the carrier element 13 rests on the arm rest 05. The table element 21 of the tray device 11 comprises the table surface 22, which 22 is appropriately available for placing items thereon.

Figure 4:
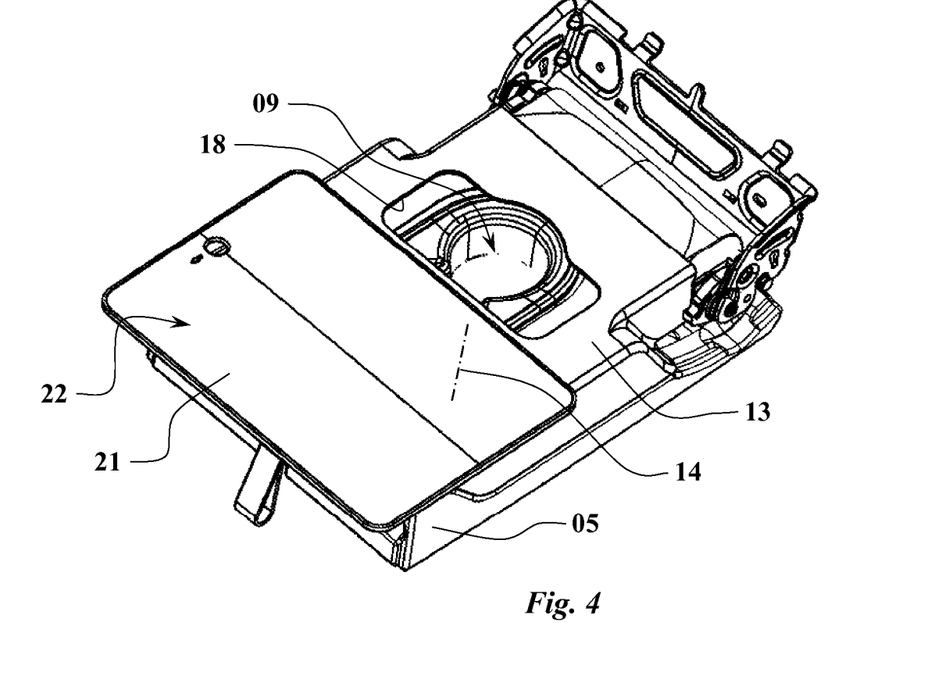
FIG. 4 shows the center arm rest in addition to FIG. 3 with a swiveled table element.

In FIG. 4, in addition to FIG. 3, the forward displacement of the rotatably mounted table element 21 is illustrated. Although the table surface 22 in FIG. 3 is already available for storage, its usability is significantly facilitated by the swivel motion of the table element 21, because now the table surface 22 is further in front and length and width have switched positions so that the table surface 22 is located closer to the passengers sitting in the seats. It is a further special feature of this embodiment that through the opening 18 in the carrier element 13 now at least one of the two storage locations present in the cup holder 19 is accessible. The swiveling of the table element 21 takes place via the mounting of the table element 21 on the carrier element 13 at the rotation axis 14. Due to its 14 eccentric arrangement both in the table element 21 and in the carrier element 13, a corresponding forward displacement can be achieved while switching length and width.

Figure 5:
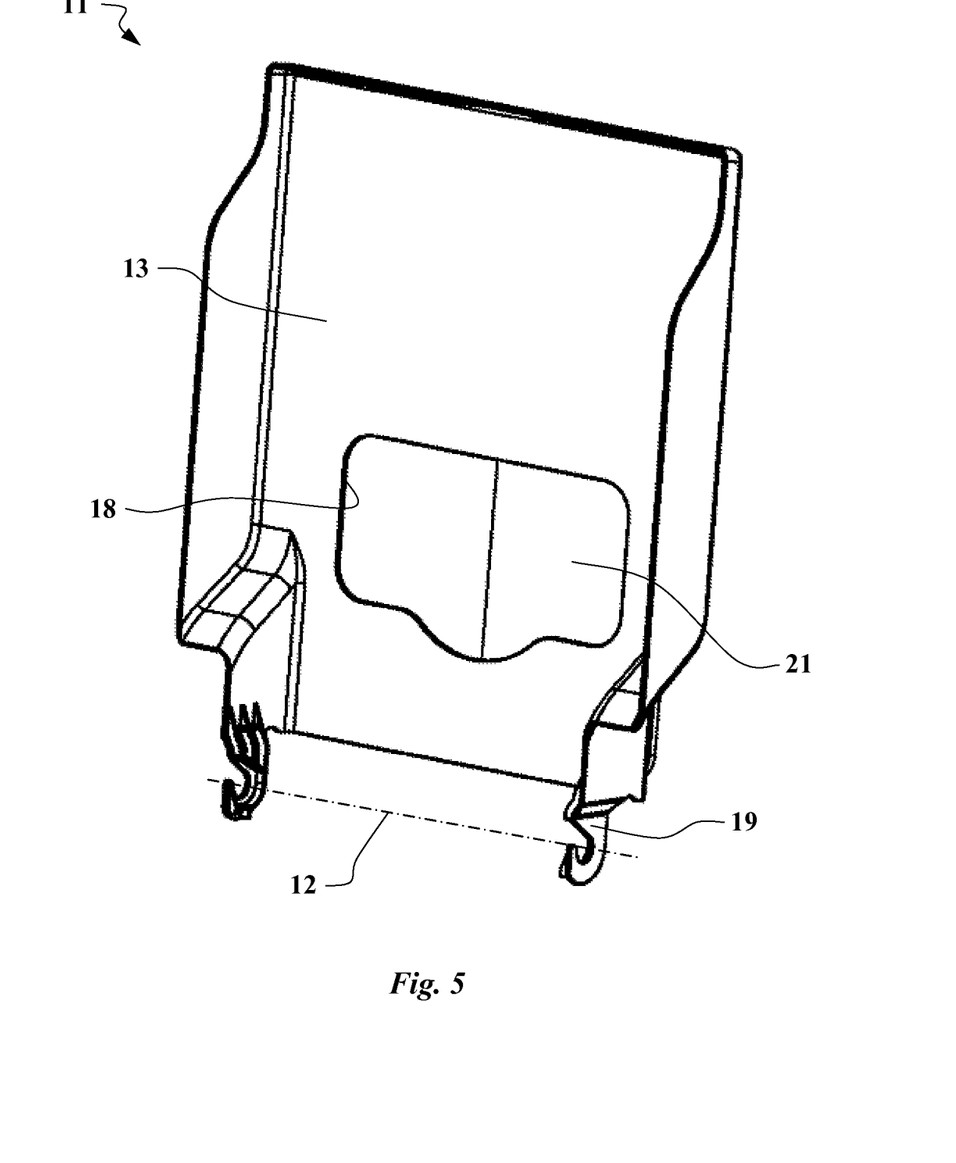
FIG. 5 shows the tray device in the non-use position.

In FIG. 5, the tray device 11 of the center arm rest 01 is shown once more in the non-use position. Again, the carrier element 13 is visible, which 13 has the opening 18, which in turn is covered by the table element 21. The tray device 11 is mounted at the hinge axis 12, the mounting taking place on both sides by means of straps 19 which are formed in the shape of a hook. It is obvious how the tray device 11 can be mounted on a bearing bolt because of this hook shape open to one side.

Figure 6A:
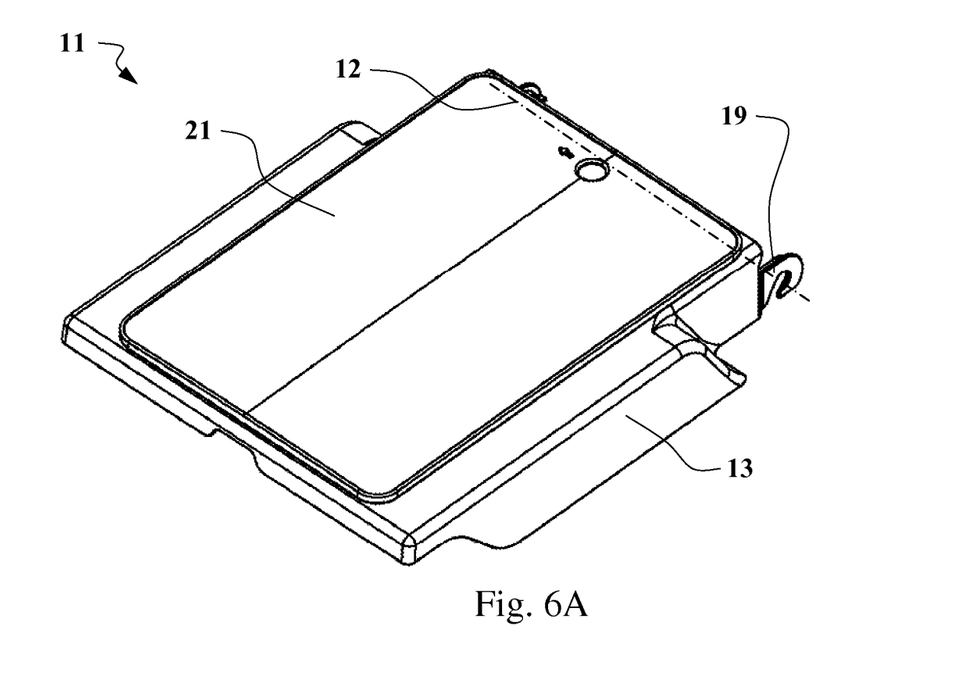
FIGS. 6A-B show the tray device in the use position.
Figure 6B:
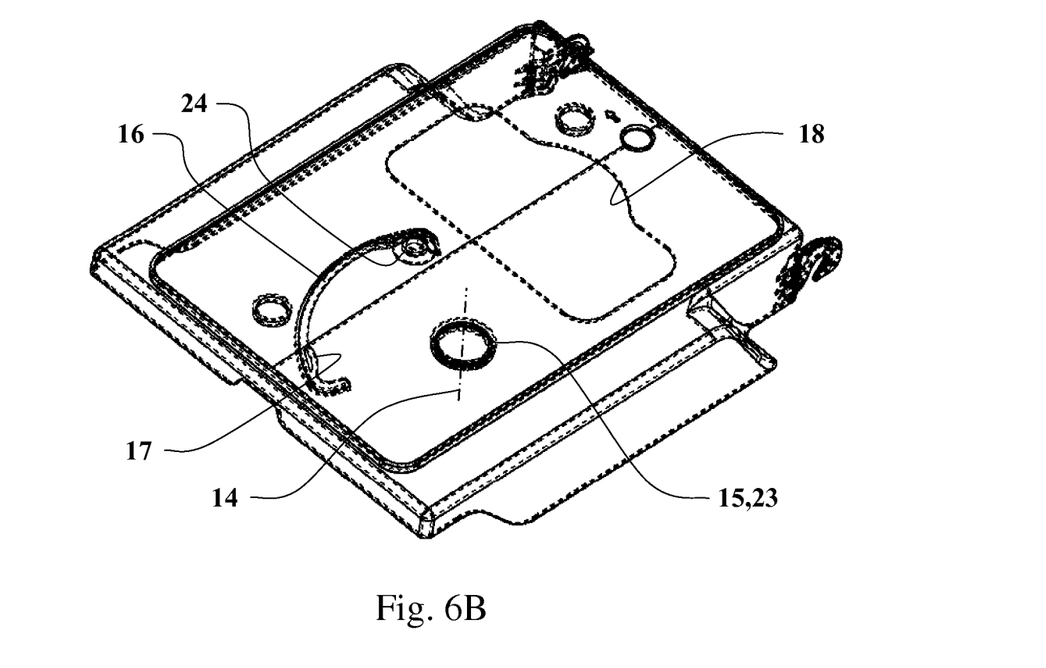

FIGS. 6*a* and 6*b* show the tray device 11 in the use position, wherein the table element 21 is initially in the unchanged position with respect to the carrier element 13. The mounting of the table element 21 on the carrier element 13 is visible in FIG. 6*b*, wherein at the rotation axis 14 a latching connection between the table element 21 and the carrier element 13 is used in the form of a latching pin 15 and a latching sleeve 23. Due to the eccentric arrangement of the rotation axis 14, in this advantageous embodiment an annular groove 16, which is concentric to the rotation axis 14, is used at the carrier element 13 between the table element 21 and the carrier element 13 for stabilization and for a better hold, wherein a holding means 24 of the table element 21 engages into said groove 16. This embodiment further facilitates the possibility of locking the table element 21 in the end positions by introducing latching means 17 at the latching groove 16. This becomes apparent by a comparison of the two end positions in FIG. 6b and in FIG. 8b.

To provide the operator with a better handling for adjusting the table element 21, the latter has an actuation opening on the side facing the swivel axis.

Figure 7:
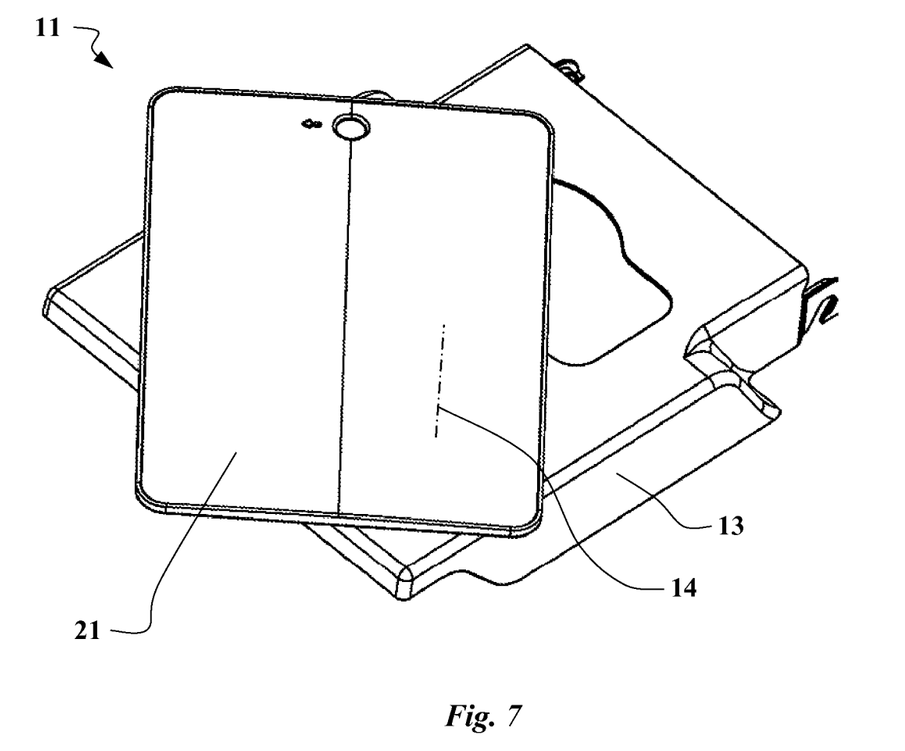
FIG. 7 shows the swivel motion of the table element of the tray device.

FIG. 7 now shows a state during the swivel motion of the table element 21 relative to the carrier element 13.

Figure 8A:
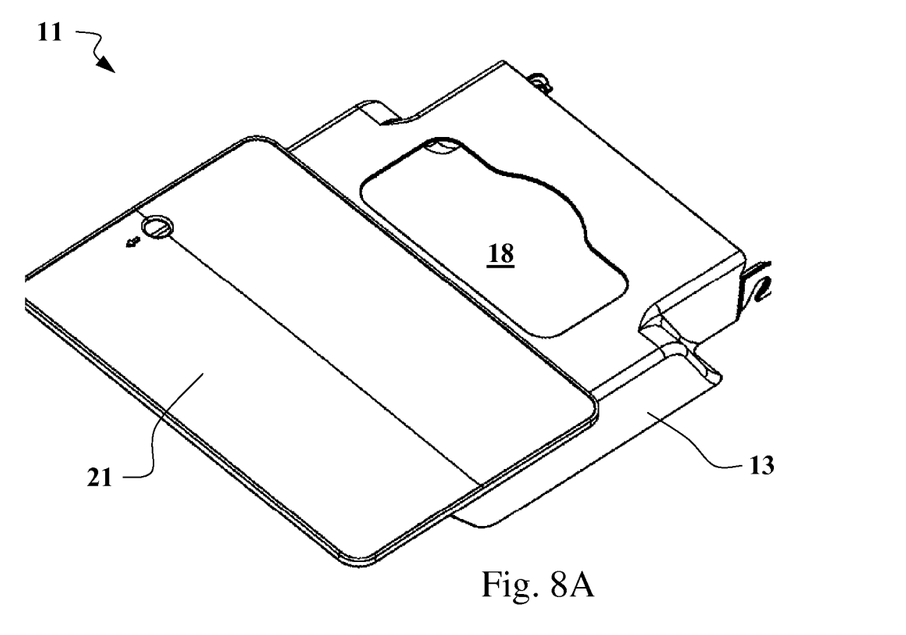
FIGS. 8A-B show the tray device in the use position with a swiveled table element.
Figure 8B:
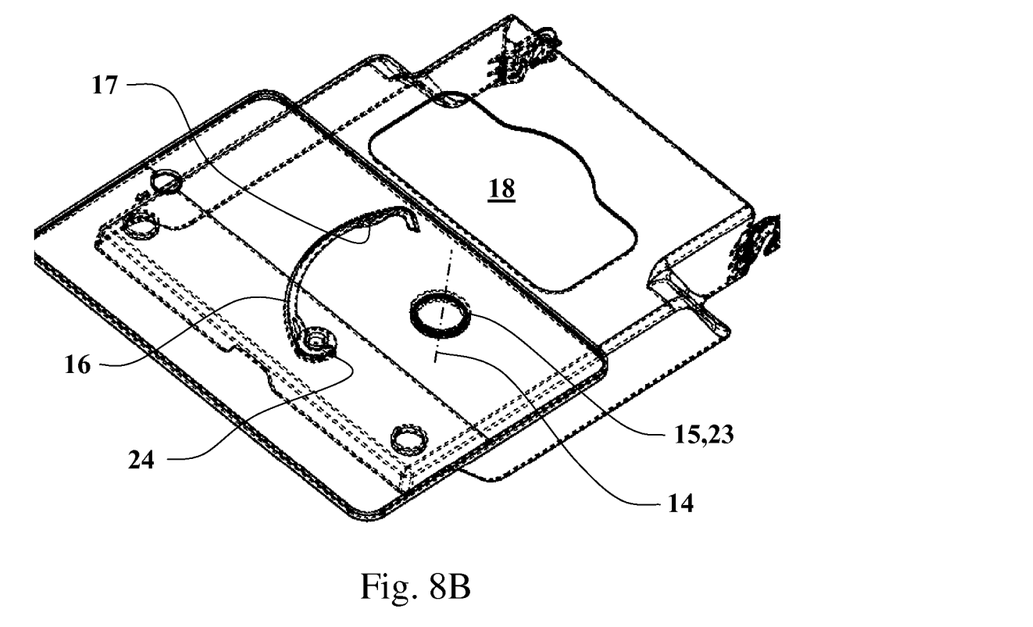

In FIGS. 8a and 8b, the tray device 11 is now shown with a table element 21 swiveled forward, wherein the holding means 24 of the table element 21 is now located at the other end of the annular groove 16 of the carrier element 13 and is locked in this end position due to the latching means 17. It is further visible that the opening 18 in the carrier element 13 is now unblocked by the table element 21.

Figure 9:
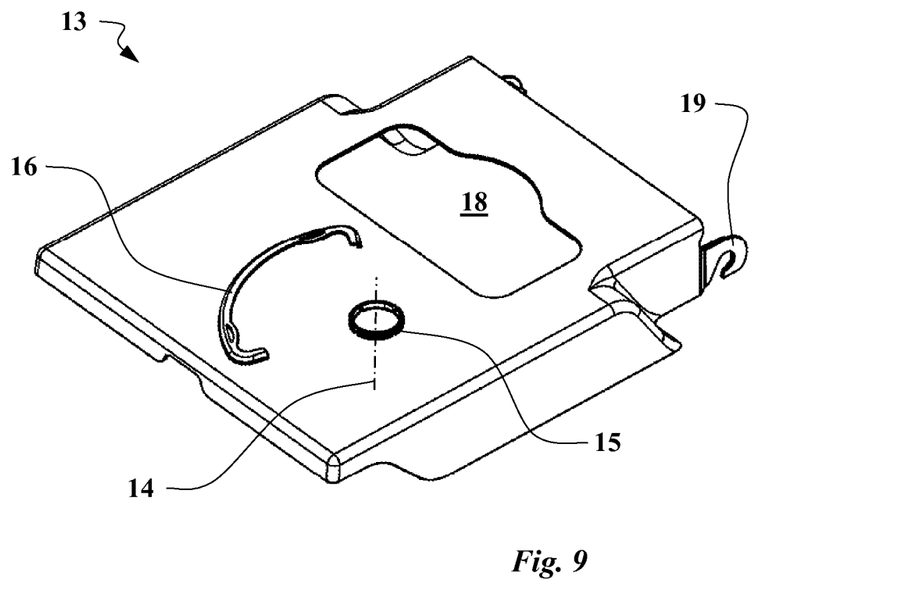
FIG. 9 shows the carrier element of the tray device.

In FIG. 9, the carrier element 13 of the tray device 11 is now shown, wherein, in addition to the opening 18 and the bearing straps 19, the latching pin 15 and the annular groove 16 are visible, too. To allow for the latching of the elements, the latching pin 15 is designed with multiple segments.

Figure 10:
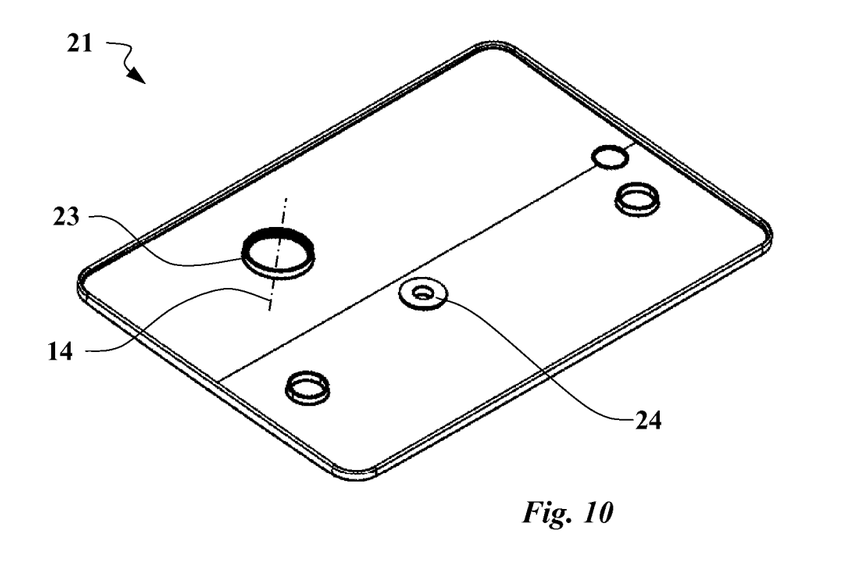
FIG. 10 shows the table element of the tray device.

In FIG. 10, the table element 21 of the tray device 11 is shown in a view from the bottom, wherein at the rotation axis 14, the respective latching sleeve 23 and the holding means 24 are correspondingly visible, the latter engaging into the respective annular groove 16.

The invention claimed is:

1. A center arm rest for use in a vehicle, comprising:
a console part being directly attachable to a vehicle body,
an arm rest, which is mounted on the console part so as to be swivelable about a swivel axis between a lower use position and an upper rest position, wherein the arm rest includes a top side for resting an arm thereon, which is padded at least in sections, and a bottom side on the opposite side, which is padded at least in sections and forms part of a back rest, and
a tray device, which is swivelably mounted in the center arm rest and which is in an upper non-use position behind the arm rest when the arm rest is in the rest position and which is swivelable about a hinge axis between the non-use position and a lower use position having the tray device resting on the top side of the arm rest when the arm rest is in the use position, the tray device further comprising:
a table surface, which is substantially planar in the use position;
a carrier element; and
a table element forming the table surface, the table element being arranged on the carrier element so as to be slidable in the plane of the table surface and/or so as to be swivelable vertically to the table surface about a rotation axis.

2. The center arm rest according to claim 1, wherein a width of the table element is smaller than a width of the arm rest and a length of the table element is larger than the width of the arm rest, wherein in the use position, the table element extends beyond the arm rest on both sides by being swiveled.

3. The center arm rest according to claim 1, wherein the rotation axis is arranged eccentrically, a forward displacement thus taking place when the table element is swiveled.

4. The center arm rest according to claim 1, wherein the carrier element or the table element has an annular groove, in which a holding means of the table element or of the carrier element engages, the groove having latching means for defining the end positions.

5. The center arm rest according to claim 1, wherein the arm rest comprises at least one storage component, and the carrier element comprises an opening in the area of the at least one storage component, the table element unblocking access to the at least one storage component at least partially by sliding and/or swiveling.

6. The center arm rest of claim 5, wherein the at least one storage component comprises a cup holder.

7. The center arm rest according to claim 1, wherein the swivel axis is also the hinge axis.

8. The center arm rest according to claim 1, wherein the tray device has bearing straps on both sides for mounting the tray device, which are arranged laterally of the arm rest.

9. The center arm rest according to claim 8, wherein the bearing straps comprise a hook shape which opens transversally to the hinge axis.

10. The center arm rest according to claim 8, wherein the console part or the arm rest comprise first bearing means on both sides, and each bearing strap has a second bearing means that is complementary to the first bearing means, the bearing straps being elastically deformable in the direction of the hinge axis for the mounting of the tray device.

11. The center arm rest of claim 1, wherein the table surface includes a slip-resistant surface structure and/or surface coating.

12. The center arm rest of claim 8, wherein arranged laterally comprises between the arm rest and the console part.

13. A center arm rest for use in a vehicle, comprising:
a console part being indirectly attachable to a vehicle body,
an arm rest, which is mounted on the console part so as to be swivelable about a swivel axis between a lower use position and an upper rest position, wherein the arm rest includes a top side for resting an arm thereon, which is padded at least in sections, and a bottom side on the opposite side, which is padded at least in sections and forms part of a back rest, and
a tray device, which is swivelably mounted in the center arm rest and which is in an upper non-use position behind the arm rest when the arm rest is in the rest position and which is swivelable about a hinge axis between the non-use position and a lower use position having the tray device resting on the top side of the arm rest when the arm rest is in the use position, the tray device further comprising:
a table surface, which is substantially planar in the use position;
a carrier element; and
a table element forming the table surface, the table element being arranged on the carrier element so as to be slidable in the plane of the table surface and/or so as to be swivelable vertically to the table surface about a rotation axis.

14. The center arm rest according to claim 13, wherein a width of the table element is smaller than a width of the arm rest and a length of the table element is larger than the width of the arm rest, wherein in the use position, the table element extends beyond the arm rest on both sides by being swiveled.

15. The center arm rest according to claim 13, wherein the rotation axis is arranged eccentrically, a forward displacement thus taking place when the table element is swiveled.

16. The center arm rest according to claim 13, wherein the carrier element or the table element has an annular groove, in which a holding means of the table element or of the carrier element engages, the groove having latching means for defining the end positions.

17. The center arm rest according to claim 13, wherein the arm rest comprises at least one storage component, and the carrier element comprises an opening in the area of the at least one storage component, the table element unblocking access to the at least one storage component at least partially by sliding and/or swiveling.

18. The center arm rest according to claim 13, wherein the tray device has bearing straps on both sides for mounting the tray device, which are arranged laterally of the arm rest.

19. The center arm rest according to claim 13, wherein the bearing straps comprise a hook shape which opens transversally to the hinge axis.

20. The center arm rest according to claim 13, wherein the console part or the arm rest comprise first bearing means on both sides, and each bearing strap has a second bearing means that is complementary to the first bearing means, the bearing straps being elastically deformable in the direction of the hinge axis for the mounting of the tray device.

* * * * *